United States Patent Office 3,796,701
Patented Mar. 12, 1974

3,796,701
5α,9-OXAZINO STEROIDS AND 9-CARBOXAMIDO STEROIDS
Christopher M. Cimarusti, Hamilton, and Seymour D. Levine, North Brunswick, N.J., assignors to E. R. Squibb & Sons, Inc., Princeton, N.J.
No Drawing. Filed Feb. 26, 1973, Ser. No. 336,103
Int. Cl. C07c 173/00
U.S. Cl. 260—239.55 D
17 Claims

ABSTRACT OF THE DISCLOSURE

5α,9-Oxazino steroids and 9-carboxamido steroids, having utility as anti-inflammatory agents, are disclosed.

SUMMARY OF THE INVENTION

Steroids having the formula:

(I)
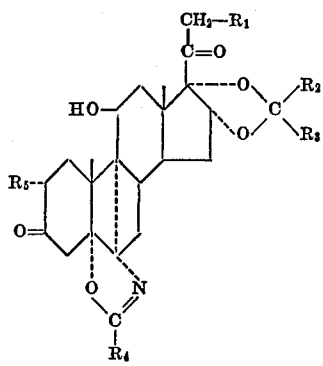

(II)
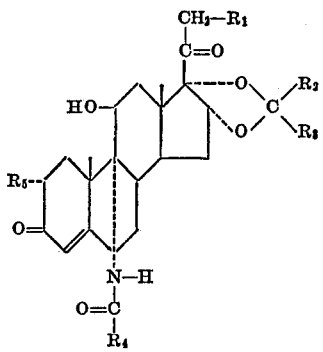

or
(III)
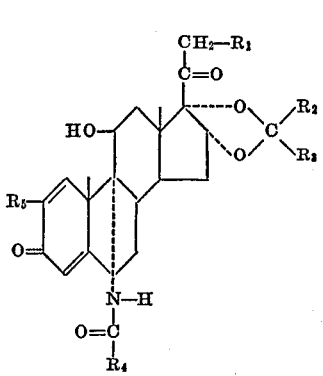

are useful as topical anti-inflammatory agents. In Formulas I, II, and III, and throughout the specification, the symbols have the following meanings:

$R_1$ may be hydroxyl, halo, or lower alkanoyloxy (preferably acetoxy);
$R_2$ may be hydrogen, lower alkyl, or aryl;
$R_3$ may be lower alkyl or aryl;
$R_4$ may be lower alkyl or aryl; and
$R_5$ may be hydrogen or methyl.

DETAILED DESCRIPTION OF THE INVENTION

The steroids of Formulas I, II, and III are physiologically active substances that possess glucocorticoid and anti-inflammatory activity and can be used in various mammalian species such as domestic animals, e.g., dogs and cats. They can be used topically in lieu of known glycocorticoids in the treatment of skin conditions such as dermatitis, sunburn, neurodermatitis, eczema, and anogential pruritus. The compounds of this invention may be used in the range of 0.01 to 5.0% by weight, preferably 0.05 to 2.0% by weight, in a conventional cream or lotion.

The expression "lower alkyl" refers to straight and branched chain hydrocarbon groups having from 1 to 7 carbon atoms, e.g., methyl, ethyl, propyl, isopropyl, t-butyl, heptyl, etc.

The expression "aryl" refers to a mono- or bicarbocyclic aromatic ring system having 6 to 10 carbon atoms; e.g. phenyl or naphthyl.

The halogens contemplated for use in this invention are F, Cl, Br, and I.

The expression "lower alkanoyloxy" refers to groups having the formula

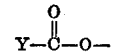

wherein Y is lower alkyl.

The steroids of Formulas I, II, and III are prepared from 9β,11β-epoxy steroids having the following formula:

(IV)
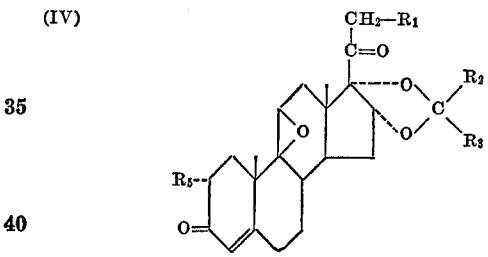

The 9β,11β-epoxy steroids of Formula IV are prepared from a 9-halo steroid having the following formula:

(V)
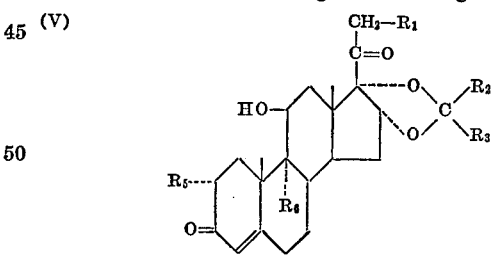

In Formula V, and throughout the specification, $R_6$ is halo. The 9-halo steroids of Formula V are known; see, for example, U.S. Pat. No. 3,048,581 to Josef Fried.

The 9-halo steroids of Formula V are reacted with alkali, e.g., potassium acetate, sodium hydroxide, etc., to obtain the 9β,11β-epoxy steroids of Formula IV. The reactants are added to a polar solvent, e.g., ethanol and refluxed for about 30 minutes to about 2 hours, preferably for about 1 hour.

To obtain the 5α,9-oxazino steroids of Formula I the 9β,11β-epoxy steroids of Formula IV are reacted with a nitrile having the formula $R_4$—C≡N in an organic solvent, preferably a halogenated hydrocarbon such as dichloromethane, containing a strong acid such as perchloric acid. A solution of 1 molar equivalent of the 9β,11β-epoxy steroid of Formula IV and about 10 to 500 molar equivalents, preferably about 50 to 150 molar equivalents, of the nitrile in 30 to 50 milliliters of the organic solvent per gram of epoxy steroid, containing about 0.1 to 2.0 equivalents of the acid is stirred for about 1 day to 14 days, preferably about 4 days.

9-carboxamido steroids may be obtained by isomerization of the corresponding 5α,9-oxazino steroids of Formula I, synthesized as described above. The isomerization may be accomplished by contacting a 5α,9-oxazino steroid of Formula I with either silica gel or alumina. Crude 5α,9-oxazino steroid may be dissolved in an organic solvent, preferably a halogenated hydrocarbon such as chloroform, and then applied to a column of either alumina or silica gel. A 9-carboxamido steroid having the structure of Formula II is obtained.

Steroids of Formula II may be converted to steroids of Formula I by treatment with a strong acid, such as p-toluenesulfonic acid in acetic acid.

Alternatively, the steroids of Formulas I and II wherein $R_1$ is hydroxyl or halo may be synthesized from the corresponding steroids of Formulas I and II wherein $R_1$ is lower alkanoyloxy. Saponification of a 21-alkanoyloxy steroid of Formula I or II yields the corresponding 21-hydroxy steroid.

The 21-halo steroids may be synthesized from the corresponding 21-hydroxy steroids via steroidal 21-sulfonates. Reaction of the 21-hydroxy steroid with a lower alkyl (or aryl) sulfonyl chloride yields the corresponding 21-sulfonate, which may in turn be reacted with an inorganic halide to obtain the 21-halo steroids.

The 9-carboxamido steroids of Formula III containing ethylenic unsaturation in the 1,2-position may be obtained by reacting 9-carboxamido steroids of Formula II with an oxidizing agent that is able to selectively introduce a carbon-carbon double bond in the 1,2-position without effecting other functional groups of the steroid. 2,3-dichloro-5,6-dicyano-1,4-benzoquinone is exemplary of the oxidizing agents which meet the above requirements. About one molar equivalent of the oxidizing agent is used per molar equivalent of the 9-carboxamido steroids of Formula IV. The oxidation reaction is conducted in an organic solvent such as benzene, toluene, dioxane, etc.; dioxane is preferred. It may be run for approximately 1 hour to 96 hours, preferably about 4 to 24 hours, at temperatures of from about 50° C. to 150° C., preferably from about 70° C. to 130° C.

The following examples further illustrate the invention.

EXAMPLE 1

9β,11β-epoxy-16α,17,21-trihydroxypregn-4-ene-3,20-dione, 21-acetate, cyclic 16,17-acetal with acetone A mixture of 6.9 grams (0.0136 moles) of 9-bromo-11β,16α,17,21-tetrahydroxypregn - 4 - ene-3,20-dione, 21-acetate, cyclic 16,17-acetal with acetone and 10.2 grams of freshly fused potassium acetate is refluxed in 400 milliliters of absolute ethanol for 1 hour. The solution is cooled, diluted with 1 liter of water, and the resulting solid filtered. The solid is dissolved in chloroform, the solution washed with water, dried, and the solvent evaporated in vacuo to give 5.9 grams of 9β,11β-epoxy-16α,17,21-trihydroxypregn-4-ene-3,20-dione, 21-acetate, cyclic 16,17-acetal with acetone. Recrystallization of the product from 180 milliliters of acetone gives, in two crops, 2.9 grams, melting point 243° C.–245° C. and 0.6 grams, melting point 241° C.–244° C.

EXAMPLE 2

11β,16α,17,21-tetrahydroxy - 5α,9 - (epoxy - 1 - ethanyl-1-ylideneamino) pregnane-3,20-dione, 21-acetate, cyclic 16,17-acetal with acetone A solution of 6.0 grams of 9β,11β-epoxy-16α,17,21-trihydroxypregn-4-ene-3,20-dione, 21-acetate, cyclic 16,17-acetal with acetone in a mixture of 200 milliliters of dichloromethane and 40 milliliters of acetonitrile is stirred for 114 hours with 0.6 milliliters of 70% perchloric acid. The solution is diluted with dichloromethane, washed with dilute sodium bicarbonate solution, dried, and the solvent evaporated in vacuo to give 6.6 grams of crude 11β,16α,-17,21 - tetrahydroxy - 5α,9 - (epoxy-1-ethanyl-1-ylideneamino)pregnane-3,20-dione, 21-acetate, cyclic 16,17-acetal with acetone. Two recrystallizations from acetone-ether give the analytical sample of 11β,16α,17,21-tetrahydroxy-5α,9 - (epoxy-1-ethanyl-1-ylideneamino)pregnane-3,20-dione, 21-acetate, cyclic 16,17-acetal with acetone, melting point 257° C.–260° C.

*Analysis.*—Calcd. for $C_{28}H_{39}NO_8$ (percent): C, 64.97; H, 7.60; N, 2.71. Found (percent): C, 64.75; H, 7.43; N, 2.58.

EXAMPLE 3

11β,16α,17,21 - Tetrahydroxy-5α,9-(epoxybenzylideneamino)-pregnane-3,20-dione, 21-acetate, cyclic 16,17-acetal with acetone A solution of 4.0 grams of 9β,11β-epoxy-16α,17,21-trihydroxypregn-4-ene-3,20-dione, 21-acetate, cyclic 16,17-acetal with acetone and 40 milliliters of benzonitrile in 140 milliliters of dichloromethane is stirred with 0.4 milliliters of 70% perchloric acid for 138 hours. The solution is washed with dilute sodium bicarbonate solution, dried, and evaporated in vacuo to give 4.28 grams of oil. This material is dissolved in 40 milliliters of 1:1 hexane-chloroform, added to a dry column of 60 grams of silica gel, and the column eluted with chloroform.

The first 200 milliliters of eluate is evaporated in vacuo, and the residue is dissolved in methanol and cooled to give 491 milligrams of product. Recrystallization from acetone-hexane gives the analytical sample of 11β,16α,17,21 - tetrahydroxy-5α,9-(epoxybenzylideneamino)-pregnane-3,20-dione, 21-acetate, cyclic 16,17-acetal with acetone, melting point 277° C.–281° C.

*Analysis.*—Calcd. for $C_{33}H_{41}NO_8$ (percent): C, 68.37; H, 7.31; N, 2.42. Found (percent): C, 68.09; H, 7.07; N, 2.34.

EXAMPLE 4

9-acetamido-11β,16α,17,21-tetrahydroxypregn-4-ene-3,20-dione, 21-acetate, cyclic 16,17-acetal with acetone A solution of 3.5 grams of 9β,11β-epoxy-16α,17,21-trihydroxypregn-4-ene-3,20-dione, 21-acetate, cyclic 16,17-acetal with acetone in a mixture of 120 milliliters of dichloromethane and 24 milliliters of acetonitrile is stirred with 0.35 milliliters of 70% perchloric acid for 72 hours. The solution is diluted with dichloromethane, washed with water and 5% sodium bicarbonate solution, dried and evaporated in vacuo to give 3.71 grams of oil.

This oil is dissolved in chloroform, added to a dry 150 gram column of silica gel, and eluted with chloroform, and 10% ethyl acetate in chloroform. Fractions containing crude 9-acetamido-11β,16α,17,21-tetrahydroxypregn-4-ene-3,20-dione, 21-acetate, cyclic 16,17-acetal with acetone are pooled and evaporated to give 1.45 grams of material. Recrystallization from acetone-ether gives the analytical sample of 9-acetamido-11β,16α,17,21-tetrahydroxypregn-4-ene-3,20-dione, 21-acetate, cyclic 16,17-acetal with acetone, melting point 263° C.–269° C., dec.

*Analysis.*—Calcd. for $C_{28}H_{39}NO_8$ (percent): C, 64.97; H, 7.60; N, 2.71. Found (percent): C, 65.06; H, 7.75; N, 2.53.

EXAMPLE 5

9-acetamido-11β,16α,17,21-tetrahydroxypregn-4-ene-3,20-dione, cyclic 16,17-acetal with acetone A solution of 400 milligrams of 9-acetamido-11β,16α,17,21-tetrahydroxypregn-4-ene-3,20-dione, 21-acetate, cyclic 16,17-acetal with acetone in 25 milliliters of 10% potassium carbonate solution is added. After 1 hour, 2.5 milliliters of 10% acetic acid is added, the solution is diluted with water and extracted with chloroform. The chloroform extract is dried and the solvent evaporated in vacuo to give 342 milligrams of solid. Two recrystallizations from acetone-hexane gives the analytical sample of 9 - acetamido - 11β,16α,17,21 - tetrahydroxypregn-4-ene-3,20-dione, cyclic 16,17-acetal with acetone, melting point ca. 330° C.–340° C., dec.

*Analysis.*—Calcd. for $C_{26}H_{37}NO_7$ (percent): C, 65.66; H, 7.84; N, 2.95. Found (percent): C, 65.36; H, 7.72; N, 2.85.

EXAMPLE 6

9-acetamido-21-chloro-11β,16α,17-trihydroxypregn-4-ene-3,20-dione, cyclic 16,17-acetal with acetone (a) 9 - acetamido-11β,16α,17,21-tetrahydroxypregn-4-ene-3,20-dione, 21-methanesulfonate, cyclic 16,17-acetal with acetone.—A solution of 1.22 grams (0.00256 mole) of 9 - acetamido-11β,16α,17,21-tetrahydroxypregn-4-ene-3,20-dione, cyclic 16,17-acetal with acetone in 5 milliliters of pyridine is cooled to 0° C. and 0.29 milliliters (0.0038 mole) of methansulfonyl chloride is added. After 150 minutes the solution is poured into ice-water and extracted with chloroform. The chloroform solution is washed with 2 N hydrochloric acid and water, dried and evaporated in vacuo to give 1.45 grams of 9-acetamido 11β,16α,17,21 - tetrahydroxypregn-4-ene-3,20-dione, 21-methane-sulfonate, cyclic 16,17-acetal with acetone which crystallizes on trituration with methanol.

(b) 9-acetamido-21-chloro-11β,16α,17-trihydroxypregn-4-ene-3,20-dione, cyclic 16,17-acetal with acetone.—1.45 grams of crude 9-acetamido-11β,16α,17,21-tetrahydroxypregn-4-ene-3,20-dione, 21-methanesulfonate, cyclic 16,17-acetal with acetone is dissolved in 50 milliliters of dimethylformamide and refluxed for 1 hour with 1.0 gram of lithium chloride. The cooled solution is poured into ice water and the solid filtered and dried to give 743 milligrams of 9-acetamido-21-chloro-11β,16α,17-trihydroxypregn-4-ene-3,20-dione, cyclic 16,17-acetal with acetone. The filtrate is extracted with ethyl acetate and the ethyl acetate solution is dried and evaporated to give 250 milligrams of oil. The oil is combined with the above solid and plate chromatographed on two 2-millimeter thick, 20 x 20 centimeter silica gel plates. After development with ethyl acetate, the ultraviolet-active band of highest $R_f$ is excised, eluted with ethyl acetate, and the combined eluates evaporated in vacuo to give 752 milligrams of product. Two recrystallizations from acetone-hexane gives the analytical sample of 9-acetamido-21-chloro-11β,16α, 17 - trihydroxypregn-4-ene-3,20-dione, cyclic 16,17-acetal with acetone, melting point 310° C.–312° C., dec.

*Analysis.*—Calcd. for $C_{26}H_{36}ClNO \cdot H_2O$ (percent): C, 60.98; H, 7.48; N, 2.74; Cl, 6.92. Found (percent): C, 60.68; H, 7.19; N, 2.72; Cl, 7.06.

The sample is dried at 125° C., leading to a loss of 3.67% total weight; the value calculated for a monohydrate is 3.51%.

*Analysis.*—Calcd. for $C_{26}H_{36}ClNO_6$ (percent): C, 63.21; H, 7.35. Found (percent): C, 63.34; H, 7.29.

EXAMPLE 7

11β,16α,17,21-tetrahydroxy-5α,9 - (epoxy - 1-ethanyl-1-ylideneamino)pregnane-3,20-dione, 21-acetate, cyclic 16,17-acetal with acetone A solution of 100 milligrams of 9-acetamido-11β,16α-17,21-tetrahydroxypregn-4-ene-3,20-dione, 21-acetate, cyclic 16,17-acetal with acetone in 10 milliliters of acetic acid and a crystal of p-toluenesulfonic acid is stirred for 3 hours then evaporated in vacuo. The residue is taken up in chloroform, washed with sodium bicarbonate solution, and dried. Solvent removal gives 11β,16α,17,21-tetrahydroxy-5α,9-(epoxy - 1 - ethanyl-1-ylideneamino) pregnane-3,20-dione, 21-acetate, cyclic 16,17-acetal with acetone.

What is claimed is:

1. A compound having the structure selected from the group consisting of:

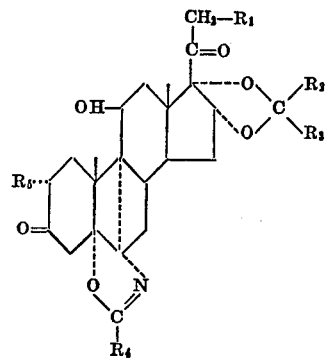

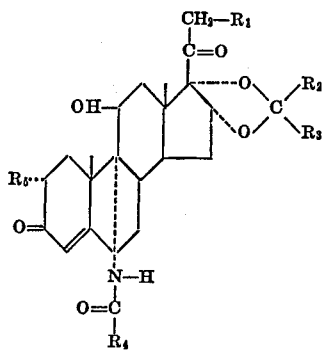

and

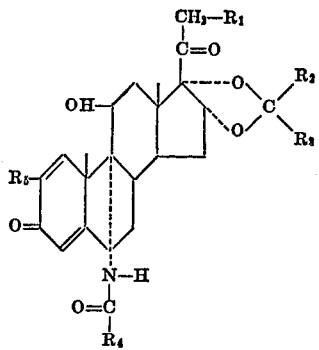

wherein $R_1$ is selected from the group consisting of hydroxyl, halo, and lower alkanoyloxy; $R_2$ is selected from the group consisting of hydrogen, lower alkyl, and aryl; $R_3$ is selected from the group consisting of lower alkyl and aryl; $R_4$ is selected from the group consisting of lower alkyl and aryl; and $R_5$ is selected from the group consisting of hydrogen and methyl.

2. A compound in accordance with claim 1 having the structure:

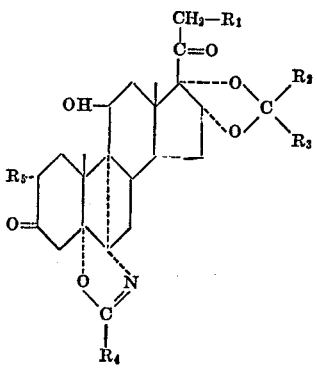

3. A compound in accordance with claim 1 having the structure:

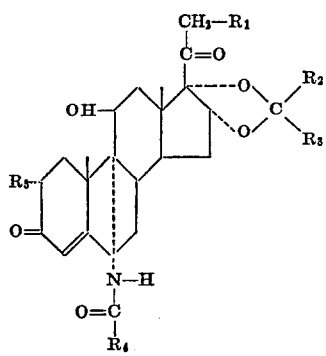

4. A compound in accordance with claim 1 having the structure:

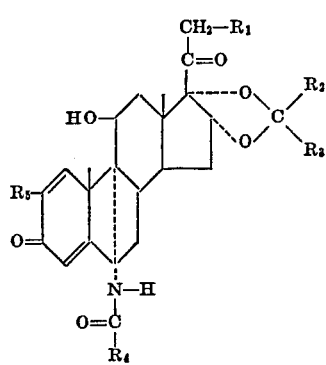

5. A compound in accordance with claim 1 wherein $R_1$ is hydroxyl.

6. A compound in accordance with claim 1 wherein $R_1$ is halo.

7. A compound in accordance with claim 1 wherein $R_1$ is lower alkanoyloxy.

8. A compound in accordance with claim 7 wherein $R_1$ is acetoxy.

9. A compound in accordance with claim 1 wherein $R_4$ is lower alkyl.

10. A compound in accordance with claim 1 wherein $R_4$ is aryl.

11. A compound in accordance with claim 1 wherein $R_5$ is hydrogen.

12. A compound in accordance with claim 1 wherein $R_5$ is methyl.

13. A compound in accordance with claim 1 having the name $11\beta,16\alpha,17,21$ - tetrahydroxy-$5\alpha,9$-(epoxy-1-ethanyl-1-ylideneamino)pregnane-3,20-dione, 21-acetate, cyclic 16,17-acetal with acetone.

14. A compound in accordance with claim 1 having the name $11\beta,16\alpha,17,21$ - tetrahydroxy - $5\alpha,9$-(epoxybenzylylideneamino)pregnane-3,20-dione, 21-acetate, cyclic 16,17-acetal with acetone.

15. A compound in accordance with claim 1 having the name 9-acetamido-$11\beta,16\alpha,17,21$-tetrahydroxypregn-4-ene-3,20-dione, 21-acetate, cyclic 16,17-acetal with acetone.

16. A compound in accordance with claim 1 having the name 9-acetamido-$11\beta,16\alpha,17$-21-tetrahydroxypregn-4-ene-3,20-dione, cyclic 16,17-acetal with acetone.

17. A compound in accordance with claim 1 having the name 9-acetamido-21-chloro-$11\beta,16\alpha,17$-trihydroxypregn-4-ene-3,20-dione, cyclic 16,17-acetal with acetone.

References Cited
UNITED STATES PATENTS
| | | | |
|---|---|---|---|
| 3,079,381 | 2/1963 | Bowers | 260—239.5 |
| 3,282,928 | 11/1966 | Cantrall et al. | 260—239.5 |

OTHER REFERENCES
Teulon et al.: C. R. Acad. Sci. Ser. C 272, 1254 (1971).

HENRY A. FRENCH, Primary Examiner

U.S. Cl. X.R.

260—999

Part 1 of 4

UNITED STATES PATENT OFFICE
CERTIFICATE OF CORRECTION

Patent No. 3,796,701　　　　　　Dated March 12, 1974

Inventor(s) Christopher M. Cimarusti & Seymour D. Levine

It is certified that error appears in the above-identified patent and that said Letters Patent are hereby corrected as shown below:

Formula I, Column I, lines 17 to 31, and the formula in Column 6, Claim 1, lines 4 to 18 should read as follows:

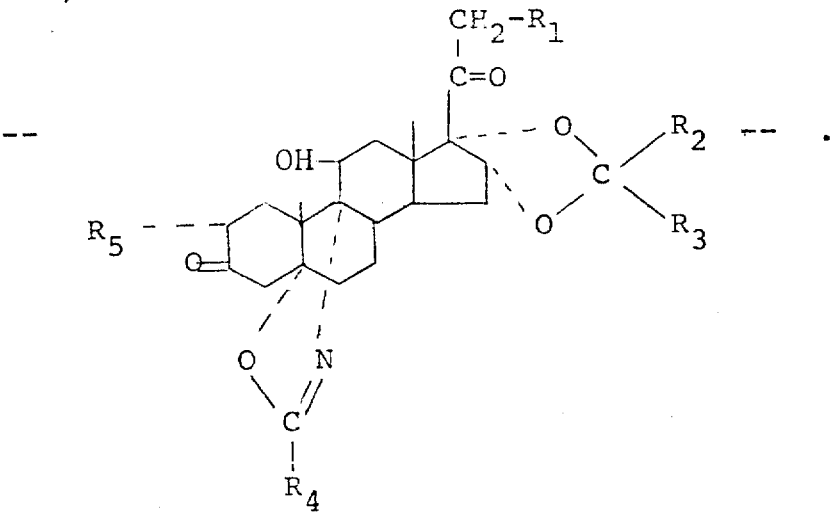

Formula II, Column I, lines 32 to 47, and the formula in Column 6, Claim 1, lines 19 to 33 should read as follows:

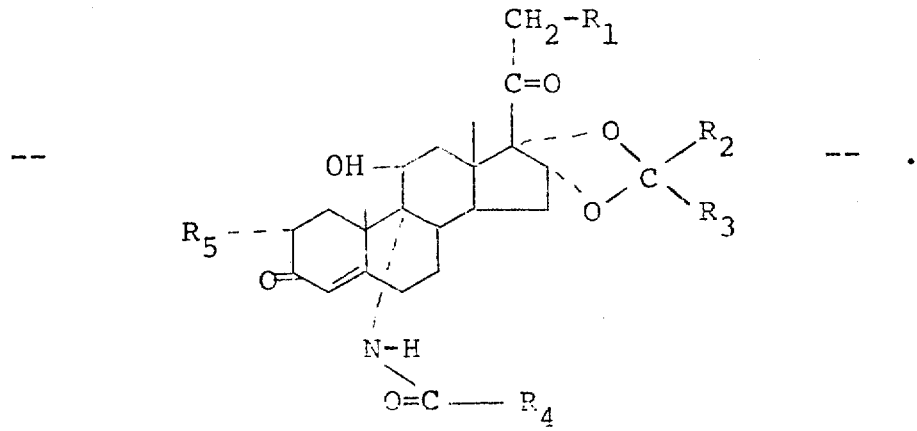

Part 2 of 4

PO-1050
(5/63)

UNITED STATES PATENT OFFICE
CERTIFICATE OF CORRECTION

Patent No. 3,796,701                Dated March 12, 1974

Inventor(s) Christopher M. Cimarusti & Seymour D. Levine

It is certified that error appears in the above-identified patent and that said Letters Patent are hereby corrected as shown below:

Formula III, Column I, lines 48 to 63, and the formula in Column 6, Claim 1, lines 35 to 49 should read as follows:

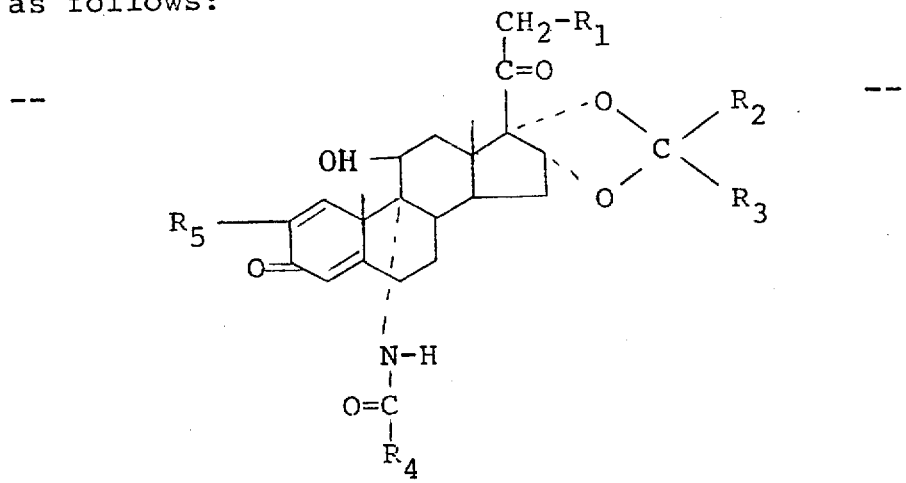

Column 4, line 10, that portion reading: "$C_{28}R_{39}NO_8$" should be: -- $C_{28}H_{39}NO_8$ --.

Column 4, line 73, after the word "of" insert the following:
    -- methanol is swept with nitrogen and 2.5 milliliters of --.

UNITED STATES PATENT OFFICE
CERTIFICATE OF CORRECTION

Patent No. 3,796,701   Dated March 12, 1974

Inventor(s) Christopher M. Cimarusti & Seymour D. Levine

It is certified that error appears in the above-identified patent and that said Letters Patent are hereby corrected as shown below:

Column 6, Claim 2, lines 60 to 75, the structure should read:

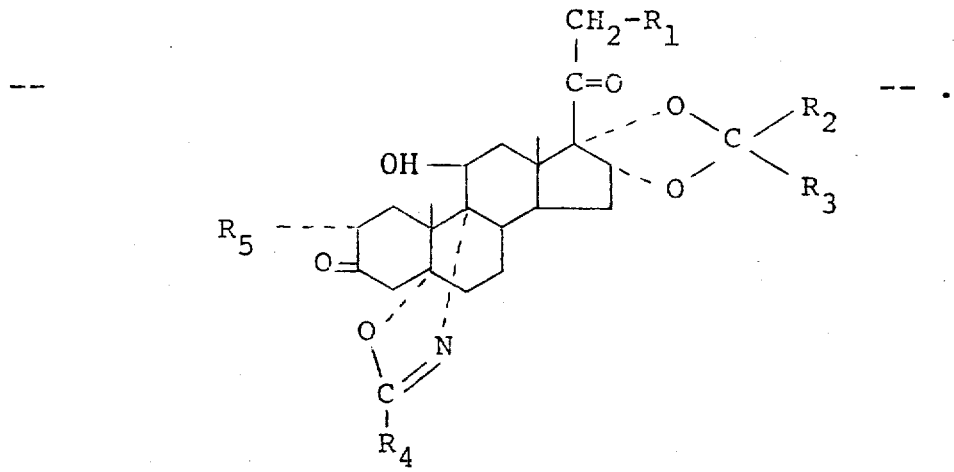

Column 7, Claim 3, lines 3 to 16, the structure should read:

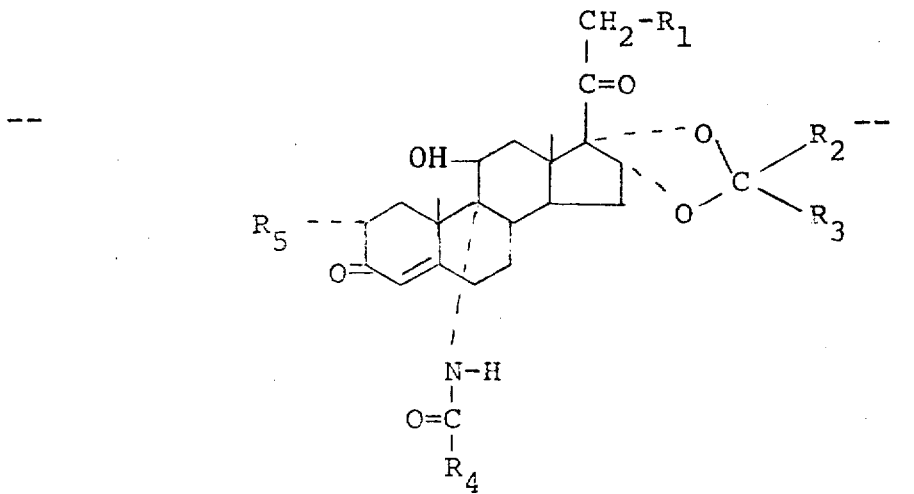

UNITED STATES PATENT OFFICE
CERTIFICATE OF CORRECTION

Patent No. 3,796,701            Dated March 12, 1974

Inventor(s) Christopher M. Cimarusti & Seymour D. Levine

It is certified that error appears in the above-identified patent and that said Letters Patent are hereby corrected as shown below:

Column 7, Claim 4, lines 20 to 33, the structure should read:

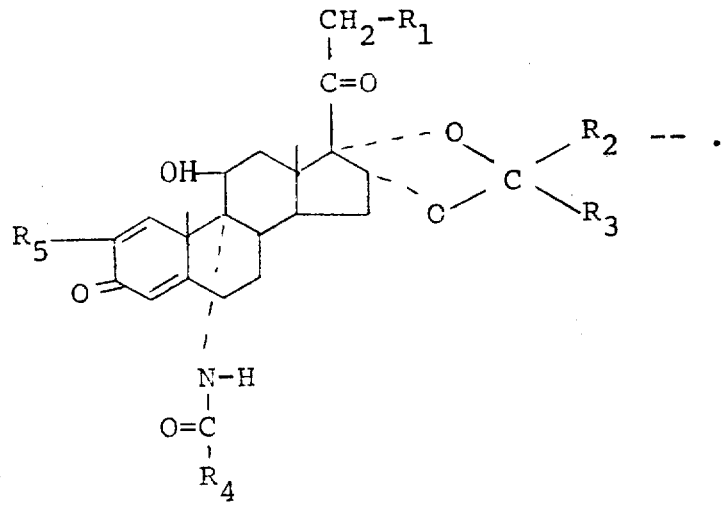

Signed and Sealed this thirtieth Day of March 1976

[SEAL]

Attest:

RUTH C. MASON
Attesting Officer

C. MARSHALL DANN
Commissioner of Patents and Trademarks